April 8, 1969 R. E. HULL 3,437,836

VOLTAGE ADJUSTABLE LIMITER FOR OPERATIONAL ELEMENTS

Filed Nov. 17, 1965

WITNESSES:
Bernard R. Gagney
James F. Young

INVENTOR
Robert E. Hull

BY Samuel Oddi
ATTORNEY

United States Patent Office 3,437,836

Patented Apr. 8, 1969

3,437,836
VOLTAGE ADJUSTABLE LIMITER FOR OPERATIONAL ELEMENTS

Robert E. Hull, Amherst, Buffalo, N.Y., assignor to Westinghouse Electric Corporation, Pittsburgh, Pa., a corporation of Pennsylvania Filed Nov. 17, 1965, Ser. No. 508,224
Int. Cl. H03k *5/08*
U.S. Cl. 307—237 7 Claims

ABSTRACT OF THE DISCLOSURE

A limiter circuit for controlling the output limits of an operational amplifier is disclosed wherein the output limits of either polarity are independently adjustable in response to the magnitude and polarity of a control voltage.

The present invention relates to limiter circuits and more particularly to limiter circuits for limiting the output voltage excursions of operational elements.

In many circuit applications it is necessary that the positive and negative voltage excursions of an operational element be maintained within defined limits. This is especially true in control systems wherein the output voltages of operational amplifiers must be held within predetermined limits to perform the desired control functions. Prior art limiter circuits for use with operational amplifiers usually employ threshold devices to limit the output of the operational amplifier. In order to change the output limit level, it becomes necessary to replace the threshold device or to make other circuit modifications. A limiter circuit is disclosed in copending application Ser. No. 508,778, filed Nov. 19, 1965, by the same inventor and assigned to the same assignee as the present application, which permits the setting to positive and negative output limit levels of an operational amplifier through the use of a control signal polarity of either polarity. However, in the limiter circuit of the cited application, the positive and negative limit levels are not independently adjustable. This would be a highly desirable feature to be independently able to set the positive and negative limit levels of an operational amplifier through the use of a control voltage. Moreover, it would be highly desirable to be able to set the limit levels between a zero potential level and predetermined positive and negative output limit levels.

It is therefore an object of the present invention to provide a new and improved voltage adjustable limiter circuit.

It is a further object to provide a new and improved voltage adjustable limiter circuit for use with operational elements wherein the output limit levels of either polarity may be independently set.

It is a still further object of the present invention to provide a new and improved voltage adjustable limiter circuit for use with operational elements in which the positive and negative output limits of the element may be set in response to the magnitude and polarity of control signals applied to the limiter circuit.

Broadly, the present invention provides a limiter circuit for controlling the output level of an operational element in response to control signals wherein: the limiting output level of either polarity is independently adjustable in response to the magnitude and polarity of the control signals.

Figure 1:
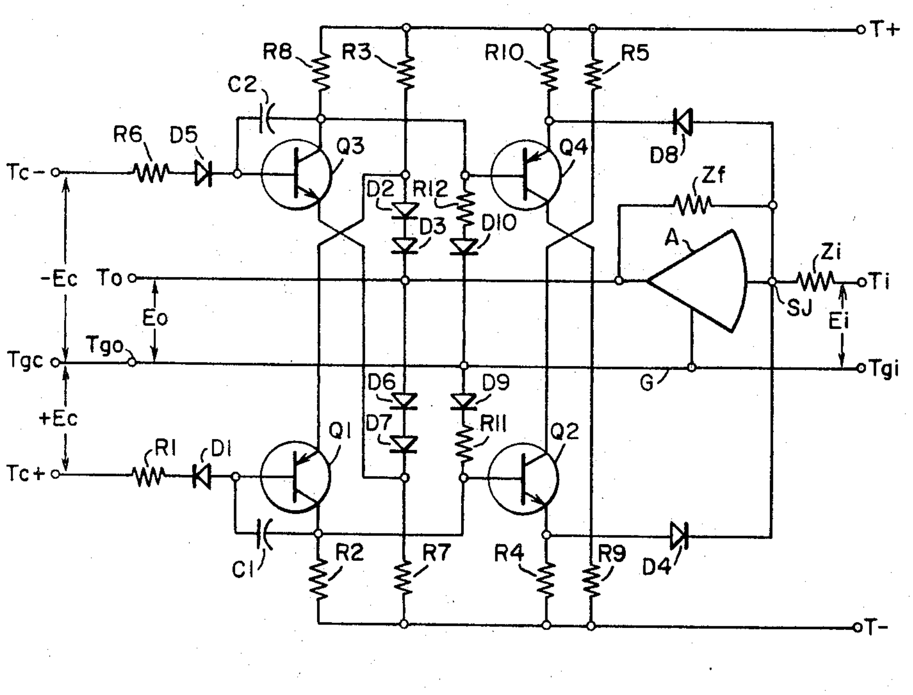
Figure 2:
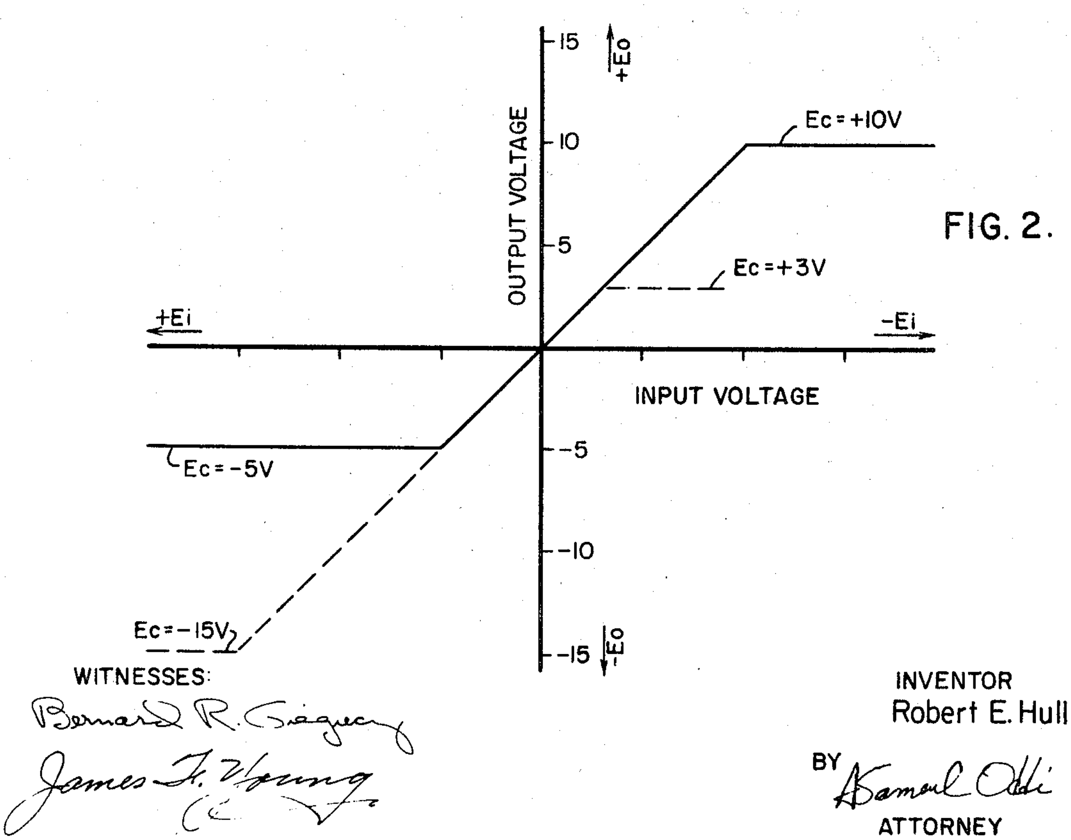

These and other objects and advantages of the present invention will become more apparent when considered in view with the following specification and drawings in which:

FIGURE 1 is a schematic diagram showing the limiter circuit of the present invention; and FIGURE 2 is a plot of output voltage versus input voltage for various control voltage levels.

Referring to FIG. 1, an operational element A is shown which is advantageously a transistor operational amplifier of the type well known in the art. The characteristics of an operational amplifier are well known and provide an output voltage proportional to its input voltage and inverted in polarity. It is the function of the presently disclosed limiter circuit to limit the output levels of the operational amplifier A between controllable limits independently of the amplitude of the input signals applied to the operational amplifier A.

An input signal voltage E*i* is applied across a pair of input terminals T*i* and T*gi*. The input terminal T*i* is connected through an input impedance Z*i* to the input of the operational amplifier A at a summing junction SJ. The terminal T*gi* is connected to a common line G, which may, for example, be at ground potential, the common line G is also coupled to the operational amplifier A. An output terminal T*o* is connected to the output of the operational amplifier A. A feedback impedance Z*f* is connected between the terminal T*o* and the summing junctions SJ. The output voltage E*o* from the operational amplifier A is developed between the terminal T*o* and a common output terminal T*go*, connected to the common line G.

The output limits for the operational amplifier A are established through the use of the control voltage +E*c* and —E*c*. The positive control voltage +E*c* is applied between a terminal T*c*+ and a common terminal T*gc*, connected to the common line G, and the negative control voltage is applied between a terminal T*c*— and the common terminal T*gc*. The terminal T*c*+ is connected to one end of a resistor R1 which has its other end connected to the cathode electrode of a diode D1. The anode electrode of diode D1 is connected to the base electrode of a transistor Q1, which is of the PNP type. The collector electrode of the transistor Q1 is connected to one end of a bias resistor R2 which has its other end connected to a negative source terminal T—. To the terminal T— is connected a negative polarity source of direct voltage, not shown. The emitter electrode of the transistor Q1 is connected to one end of a resistor R3, which has its other end connected to a positive terminal T+. A source, not shown, of positive polarity direct voltage is applied to the terminal T+ direct from a source. Between the emitter of the transistor Q1 and the output terminal T*o* of the operational amplifier A is a series connection including a diode D2 and a diode D3. The anode of the diode D2 is connected to the emitter of the transistor Q1, while the cathode of the diode D3 is connected to the output terminal T*o*, the cathode of diode D2 being connected to the anode of the diode D3. The diode pair D2, D3 acts as a threshold level setting circuit for the emitter of the transistor Q1 and will establish at the emitter of the transistor Q1 a voltage that is equal to the sum of the forward voltage drops of these diodes plus the value of the positive voltage output of the operational amplifier A appearing across the output terminal T*o* to the common terminal T*go*. Thus, if the diodes D2 and D3 are selected to be silicon diodes having a forward drop of approximately 0.7 volt, the magnitude of the voltage appearing at the emitter of the transistor Q1 will be +1.4 volts higher than the positive output voltage level E*o* at that time.

Referring now also to FIG. 2, assume for purposes of example that the positive output limit voltage of the operational amplifier A is selected to be +10 volts. A negative polarity input voltage —E*i* would be applied to the input of the operational amplifier A. In order to establish this output limit level, a control voltage +E*c* is applied between the terminals Tc+ and Tgc. As long as the output voltage Eo is less than +10 volts, the transistor Q1 will be nonconductive, the diode D1 being reverse biased by the positive polarity control voltage Ec of 10 volts applied thereto. However, assume that the output voltage Ec reaches a somewhat higher value than +10 volts. A potential will thus be established at the emitter of the transistor Q1 equal which is somewhat higher than +11.4 volts (the 10 volt output voltage plus the 1.4 volts forward voltage drop of the diodes D2 and D3). Under these conditions the transistor Q1 will be rendered conductive, with the emitter thereof being rendered positive with respect to the base. This may be seen in that the drop from the emitter of the transistor Q1 to the terminal Tc+ is effectively equal to 1.4 volts, since the sum of the base-emitter junction drop of the transistor Q1, the forward drop of the diode D1 and the drop across the resistor R1 is substantially equal to the drop across the series connection of the diodes D2 and D3.

The transistor Q1 being rendered conductive drives the collector thereof in a positive direction. The collector of the transistor Q1 is connected to the base electrode of a transistor Q2 which is connected in an emitter-follower configuration. The emitter voltage of the transistor Q2 thus follows the voltage applied to the base electrode thereof. The transistor Q2 is biased by a resistor R4 connected between the emitter and the negative source terminal T− and a resistor R5 connected between the collector thereof and the positive source terminal T+. Between the emitter of the transistor Q2 and the summing junction SJ at the input of the operational amplifier A is connected a diode D4, with the anode electrode thereof connected to the emitter of the transistor Q2 and the cathode connected to the summing junction SJ. The diode D4 during the nonlimit operation of the amplifier A is back biased by the application of the negative source potential from the terminal T− through the resistor R4 to the anode thereof. This effectively isolates the limiter circuit from the input of the operational amplifier A during nonlimit operation. However, during limiting operation of the circuit, when the transistor Q1 is rendered conductive which drives the collector thereof in positive direction, the base of the transistor Q2, coupled to the collector of the transistor Q1, is also driven in positive direction. The emitter of the transistor Q2 is thus also rendered positive with the conduction of the transistor Q2.

The emitter of the transistor Q2 being positive, the diode D4 is forward biased which permits current flow therethrough to the summing junction SJ. Current flow into the summing junction SJ balances the drain of current from the summing junction SJ due to the excessive negative input signal −Ei. This thus prevents the input signal Ei to the operational amplifier from driving the output voltage further positive than the established 10 volt output limit set by the control voltage +Ec.

The limiting action is shown in FIG. 2 with the output voltage being limited to +10 volts independently of the magnitude input signal level Ei, with the positive polarity control voltage +Ec set at +10 volts. The positive limiting level could also be set at other limit levels such as the 3 volts by the establishment of a control voltage +Ec of +3 volts as shown by the dotted curve in FIG. 2. The limit level could also be set at a zero voltage level by the application of zero voltage between the terminal Tc+ and Tgc, so that any output voltage Eo exceeding zero volts in the positive direction would cause the limit operation to take place.

The negative excursion limit of the operational amplifier A is established by applying a negative polarity control voltage −Ec between the terminal Tc− and the common terminal Tgc. Substantially similar and symmetrical circuitry is utilized for establishing the negative output limit as is used for the positive output limit and includes a transistor Q3 which is of the NPN type and a transistor Q4 of the PNP type. These transistors correspond respectively to the transistors Q1 and Q2 previously described. The input terminal Tc− is connected to one end of a resistor R6 which has its other end connected to the anode of a diode D5. The cathode of the diode D5 is connected to the base of the transistor Q3. The emitter electrode of transistor Q3 is connected to a bias resistor R7, which has its other end connected to the negative source terminal T−. A bias resistor R8 is connected between the collector of the transistor Q3 and the positive source terminal T+. Between the emitter of the transistor Q3 and the output terminal To of the operational amplifier A is connected in series combination of a diode D6 and a diode D7. The cathode of the diode D6 is connected to the anode of the diode D7, with the anode of the diode D6 being connected to the output terminal To and the cathode of diode D7 being connected to the emitter of the transistor Q3 and one end of the resistor R7. The diodes D6 and D7 thus establish a voltage reference at the emitter of the transistor Q3 which is at a more negative potential than the output voltage by an amount equal to the forward drops of the diodes D6 and D7. Assuming these drops to be approximately 0.7 volt, the voltage applied to the emitter of the transistor Q3 will be 1.4 volts more negative than is the output voltage appearing at the terminal To.

Assume for purposes of example that the negative limiting voltage desired is −5 volts. A control voltage of −5 volts would then be applied across the terminals Tc− and Tgc. If then the output voltage Eo should exceed −5 volts, a voltage would be applied to the emitter of the transistor Q3 somewhat in excess of −6.4 volts (the −5 volt output voltage Eo plus the −1.4 volts forward drops of the diodes D6 and D7). The transistor Q3 would thus be rendered conductive to drive the collector electrode thereof in the negative direction. The collector of the transistor Q3 is coupled to the base of the transistor Q4.

The transistor Q4 is connected in an emitter-follower configuration with the collector electrode thereof connected through a bias resistor R9 to the negative source terminal T− and the emitter thereof connected through bias resistor R10 to the positive source terminal T+. The emitter electrode of the transistor Q4 is connected to the cathode electrode of a diode D8 which has its anode electrode connected to the summing junction SJ. With the transistor Q3 being rendered conductive to drive the collector thereof in a negative direction, the base of the transistor Q4 and, thus, in turn, the emitter thereof will be driven in the negative direction which will forward bias the diode D8 to permit the conduction of current therethrough. Current will thus be directed away from the summing junction SJ through the diode D8 which will cause the output of the operational amplifier A to be held at the established −5 volts limit independently of the amplitude of the input voltage Ei in the positive direction, as is shown in FIG. 2 for a control voltage of Ec=−5 volts. With the operational amplifier operating in its non-limited state, that is, supplying a negative output voltage of less than −5 volts, the diode D8 will be in a back biased condition being so biased from the positive voltage source at the terminal T+ through the resistor R10 which is connected to the cathode of the diode D8. This will effectively isolate the limiter circuit from the input of the operational amplifier during the non-limiting operative condition.

The negative output limits of the operational amplifier A can, of course, be set to other limits as determined by the magnitude of the voltage −Ec. As shown in FIG. 2, for example, with a control voltage of Ec equal −15 volts the output limit level would be established at −15 volts.

The limiter action of the present circuit can be described in terms of feedback control. That is, the feedback current through the diodes D4 and D8, respectively, for the positive and negative excursion limits, cancel the reference current through the input impedance Zi to provide only a small error current to drive the amplifier A. Since two stages of amplification are provided in the limiter circuit sufficient gain is provided to obtain very sharp limiter action and very flat regulation while in limit.

The positive and negative limit setting circuitry is substantially symmetrical, the transistors Q1 and Q2 corresponding to the transistors Q3 and Q4, respectively. The magnitudes of the direct source voltage applied to the terminals T+ and T— are substantially the same, but of opposite polarities. Also, the resistance values, of the following resistors are selected to be substantially equal: R1 and R6; R2 and R8; R7 and R3; R4 and R10; R9 and R5; and R11 and R12. The capacitors C1 and C2 are selected to have substantially the same capacitance. The diodes D1 through D10 are selected to be of one type, for example, silicon.

As previously mentioned diodes D4 and D8 are back biased during the nonlimiting operation of the operational amplifier and therefore effectively isolate the limiting circuit from the operational amplifier. This permits the operational amplifier to operate normally during nonlimiting voltage limits of its operation. Another feature of the circuit in FIG. 1 is that of a capacitor C1 being connected between the base and collector of the transistor Q1 and a capacitor C2 being connected between the base and collector of the transistor Q3. The function of these capacitors is to stabilize the operational amplifier A during its limit operation when the amplifier is capacitively loaded. Connected between the collector of the transistor Q1 and the common line G is a series circuit including a diode D9 and a resistor R11. The anode of the diode D9 is connected to the common line G, and its cathode is connected to the resistor R11; the other end of the resistor R11 is connected to the collector of the transistor Q1. A similar circuit is associated with the transistor Q3, with a resistor R12 being connected to the collector of the transistor Q3 the other end of the resistor being connected to the anode of a diode D10. The cathode of the diode D10 is connected to the common line G.

The function of the diodes D9 and D10 is to clamp the collector voltages of the respective transistors Q1 and Q3 to the forward drop voltage of the diodes (i.e., for example, —0.7 volt and +0.7 volt, respectively). By limiting the maximum voltages appearing at the collectors of the transistors Q1 and Q3, large voltages cannot develop across the capacitors C1 and C2. If such voltages were permitted this would cause a large overshoot in the output limit of the amplifier A due to the time required to discharge the capacitors C1 and C2 when driving quickly into the limit level of the circuit. The diodes D9 and D10 it should be noted are reverse biased during limit operation with the cathode of diode D9 being coupled to the collector of the transistor Q1 through the resistor R11 and the anode of diode D10 being coupled to the collector of the transistor Q3 through the resistor R12. The resistors R11 and R12 limit the magnitude of the current drawn from the base circuits of the transistors Q2 and Q4, respectively, whenever the diodes D9 and D10 are conductive.

It should also be noted that a high degree of temperature compensation is provided in the circuit of FIG. 1 because of the very close thermal tracking of the diode junctions. This may be seen from the fact that the voltage drop across diodes D2 and D3 substantially cancels the drop across the diode D5 and the base-emitter junction of the transistor Q3. Similarly, the voltage drop across the diodes D6 and D7 substantially cancels the drop across the diode D5 and the base-emitter drop of the transistor Q3. This cancellation effect also permits the limiter operation to take effect down to zero volts in either direction. The reverse breakdown of the base-emitter junctions of the transistors Q1, Q3 is prevented by the diodes D1 and D5, respectively, preventing reverse current flow which might be caused due to high values of plus or minus control voltages $\pm Ec$.

In summary, the circuit of FIG. 1 provides a limiter circuit for use with an operational element which limits the positive and negative voltage excursions of the element. The positive and negative limit values of the operational element are separately adjustable down to zero volts by the selection of the control voltage in magnitude and polarity applied to the limiter circuit. Moreover, the limiter circuit is effectively isolated from the input of the operational element whenever the element is operative within its normal, non-limiting voltage ranges.

Although the present invention has been described with certain degree of particularity, it should be understood that the present disclosure has been made only by way of example and that numerous changes in the details of construction and the combination and arrangement of parts and elements may be resorted to without departing from the spirit and scope of the present invention.

What is claimed is:

1. A limiter circuit for controlling the output limits of an operational element in response to control signals of a positive or negative polarity comprising: control circuit means for receiving said control signals to establish a reference level in response thereto indicative of the desired positive and negative output limits of said operational element; threshold means for developing a voltage proportional to the output level of said operational element and applying this voltage to said control circuit means, said control circuit means being operative to provide output signals when the output level of said operational element exceeds the positive or negative output limits established by said control signals; and limit means responsive to the output signals from said control circuit means and operatively connected to the input of said operational element to prohibit said operational element from exceeding the established positive or negative output limits thereof; said control circuit means including a first and a second trasnistor, respectively, having a plurality of electrodes, said control signals of the respective polarity being applied to a first electrode thereof, the voltage developed by said threshold means being applied to a second electrode thereof and said output signals being provided at a third electrode thereof whenever the output level of the respective polarity of said operational element exceeds the established limit levels.

2. The circuit of claim 1 wherein: said threshold means include a first and a second unidirectional device each having a predetermined forward voltage drop and each being respectively connected between the output of said operational element and the respective second electrodes of said first and second transistors.

3. The circuit of claim 1 wherein: a third and a fourth unidirectional device is operatively connected respectively to the first electrode of said first and second transistors receiving said control signals to prevent reverse junction breakdown of said transistors.

4. The circuit of claim 1 wherein: said limit means includes a fifth and sixth unidirectional device operatively connected to the input of said operational element and being responsive to output signals from said first and second transistors, respectively, these unidirectional devices being so poled to be reverse biased when said operational element is operative within its established output limits and thereby isolate said limiting circuit from said operational element but to conduct current to or from the input of said operational element when the established output limits are exceeded.

5. The circuit of claim 4 wherein: said limit means further includes third and fourth transistors for respectively receiving at one electrode thereof said output signals from the third electrodes of said first and second transistors of said control circuit means and operatively connected at another electrode thereof to said fifth and sixth unidirectional devices.

6. The circuit of claim 1 further including a capacitor connected between a pair of said electrodes of said first and second transistors respectively to stabilize said operational elements during its limiting operation.

7. The circuit of claim 1 further including a clamping unidirectional device operatively connected to the third electrode of each of said first and second transistors and being poled in such a direction to clamp the output of said first and second transistors respectively within fixed liimts during the nonlimiting operation of said operational element.

References Cited

UNITED STATES PATENTS

| | | | |
|---|---|---|---|
| 2,964,709 | 12/1960 | Mayer et al. | 328—143 |
| 2,975,369 | 5/1961 | Vance | 328—143 |
| 3,121,200 | 2/1964 | Samson | 328—143 |
| 3,209,266 | 9/1965 | White | 307—237 |

OTHER REFERENCES

Proceedings of the National Simulation Council, Charles L. Cohen and Donald S. Peck, 1957.

ARTHUR GAUSS, *Primary Examiner.*

J. D. FREW, *Assistant Examiner.*

U.S. Cl. X.R.

307—229, 235; 328—142, 143, 168, 169